United States Patent [19]

Kitamura et al.

[11] Patent Number: 4,625,103

[45] Date of Patent: Nov. 25, 1986

[54] AUTOMATIC FOCUSING DEVICE IN MICROSCOPE SYSTEM

[75] Inventors: Goro Kitamura; Hidenori Horiuchi; Masaaki Aoyama; Tokuhisa Ito, all of Tokyo, Japan

[73] Assignee: Asahi Kogaku Kogyo Kabushiki Kaisha, Tokyo, Japan

[21] Appl. No.: 556,664

[22] Filed: Nov. 30, 1983

[51] Int. Cl.⁴ .............................................. G01J 1/20
[52] U.S. Cl. .................................... 250/201; 250/204
[58] Field of Search ............... 250/201, 204; 350/518, 350/527; 354/400, 402, 404, 406

[56] References Cited

U.S. PATENT DOCUMENTS

| | | | |
|---|---|---|---|
| 3,783,270 | 1/1974 | Kamachi | 250/201 |
| 4,251,129 | 2/1981 | Suzki et al. | 350/527 |
| 4,383,757 | 5/1983 | Phillips | 250/201 |

Primary Examiner—David C. Nelms
Assistant Examiner—James G. Gatto
Attorney, Agent, or Firm—Sughrue, Mion, Zinn, Macpeak, and Seas

[57] ABSTRACT

An automatic focusing device for vertical focusing of a specimen 23 in which an enlarging condenser lens 11 is placed between a light source 12 and a half mirror 7 in an automatic focus detecting system so that an enlarged image 24 of the light source is presented to an objective 1 of the focusing microscope M.

6 Claims, 4 Drawing Figures

AUTOMATIC FOCUSING DEVICE IN MICROSCOPE SYSTEM

BACKGROUND OF THE INVENTION

This invention relates to an automatic focusing device in a microscope system which is used to inspect for example, integrated circuits (ICs).

In the automatic focusing operation of such a microscope system, a focusing detecting beam of infrared radiation is applied to a specimen mounted on a stage through a dichroic mirror and an objective which are arranged in the microscope system, and the stage is moved vertically in order to focus the microscope system. The focus is detected from the beam reflected from the specimen. There has been a strong demand for this automatic focusing function especially with the development of the IC industry. An automatic focusing device with an objective having a magnification not more than 40 is commercially available. However, an automatic focusing device is not available at all which has an objective having a magnification higher than 40, especially a magnification of 100. Accordingly, no automatic focusing device can be used for inspecting ICs and particularly LSIs which have very minute patterns.

SUMMARY OF THE INVENTION

An object of this invention is to provide an automatic focusing device in which the automatic focusing function is effective even when the magnification of the microscope system is 100 or more. The specific feature of the device resides in that a focusing detecting beam is enlarged by a condenser before it is applied to the objective in the microscope system.

One of the most important key points in realizing not only the above-described automatic focusing device but also an opto-electrical automatic control system or an photoelectric measurement system is to obtain a photoelectric signal with a superior S/N ratio. For this purpose, it is essential to increase the effective quantity of light as much as possible and to maximize the variation in the quantity of light which corresponds to a variation to be detected. The present inventors have found that these requirements are sufficiently satisfied by employing a method in which a focusing detecting beam is enlarged by a condenser and is then applied to the objective lens in the microscope system, and they thereby accomplish the invention.

DETAILED DESCRIPTION OF THE PREFERRED EMBODIMENTS

This invention will be described with reference to its embodiment.

Figure 1:
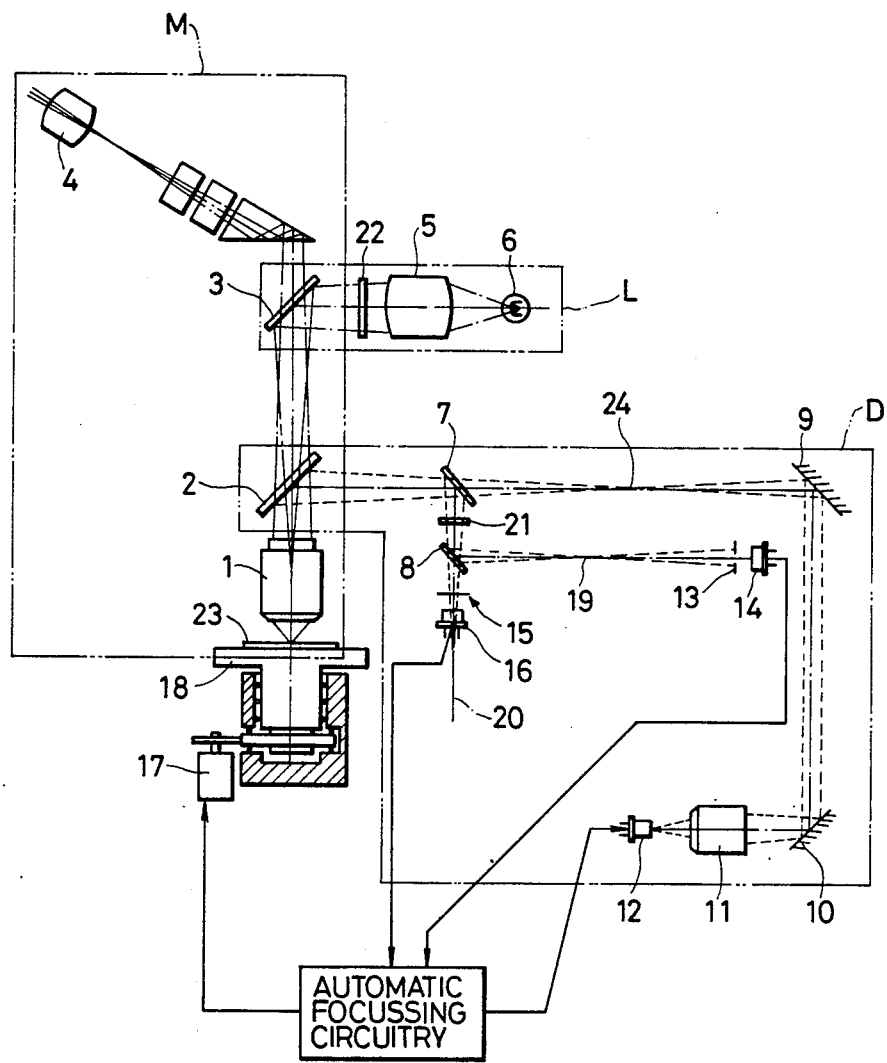
FIG. 1 is an explanatory diagram outlining the optical system of an IC inspecting microscope equipped with an automatic focusing device according to this invention and its control system.

FIG. 1 shows the optical system of an IC inspecting microscope equipped with an automatic focusing device according to the invention and the principle of its control system. In FIG. 1, an objective 1 and an eyepiece 4 form a microscope system M for observing a specimen 23 on a specimen stage 18. A dichroic mirror 2 of a focus detecting system D and a half-mirror 3 of an illuminating optical system L are arranged between the two lenses 1 and 4. The illuminating optical system L comprises an illuminating light source 6, an illuminating condenser 5 and an infrared cut-off filter 22, which illuminate a specimen 23 of opaque material such as a silicon wafer. Further in FIG. 1, reference numeral 17 designates a driving source for moving the specimen stage 18 vertically. In the focus detecting system D, an infrared beam (or a focus detecting beam) from an infrared light-emitting diode (LED) 12 is enlarged by an automatic focusing condenser 11. After the beam thus enlarged is reflected by mirrors 10 and 9, the primary enlarged image 24 of the LED is formed. The image is applied through an infrared half-mirror 7 to the above-described dichroic mirror 2. The dichroic mirror 2 passes the light of the microscope system M, but reflects the infrared beam (i.e., the focus detecting beam). The infrared beam reflected by the mirror 2 is applied through the objective 1 to the specimen 23. The beam is reflected by the specimen 23, passes through the objective 1 and is reflected by the dichroic mirror 2. The beam thus reflected is reflected by the infrared half mirror 7 and is then applied through an infrared ray cut-off filter 21 to an infrared half-mirror 8. The infrared half-mirror 8 splits the reflected beam into two beams. One of the two beams is applied through a pin hole 13 to a light receiving element 14, and the other is applied through a pin hole 15 to a light receiving element 16.

Reference numerals 19 and 20 designate conjugate image points of the automatic focusing normal focal point. The pin holes 13 and 15 are positioned with respect to the conjugate image points 19 and 20, respectively. Therefore, when the objective 1 of the microscope system M is correctly focused on the specimen 23, the quantities of light applied to the light receiving elements 14 and 16 are in a certain ratio. On the other hand, when the lens is focused above (or below) the specimen, the quantity of light applied to the light receiving element 14 is increased (or decreased) while the quantity of light applied to the light receiving element 16 is decreased (or increased). Thus, an automatic focusing system can be established by feeding back through automatic focusing circuitry the difference between the outputs of the two light receiving elements 14 and 16.

Figure 4:
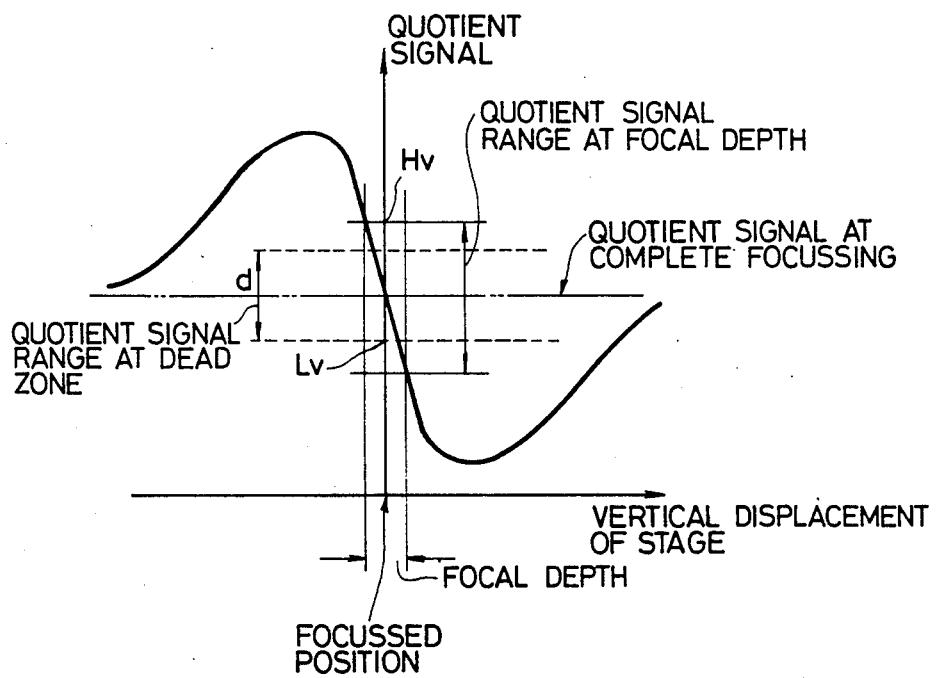
FIG. 4 is a graphical representation showing one example of a signal waveform in the control system in FIG. 3.
Figure 3:
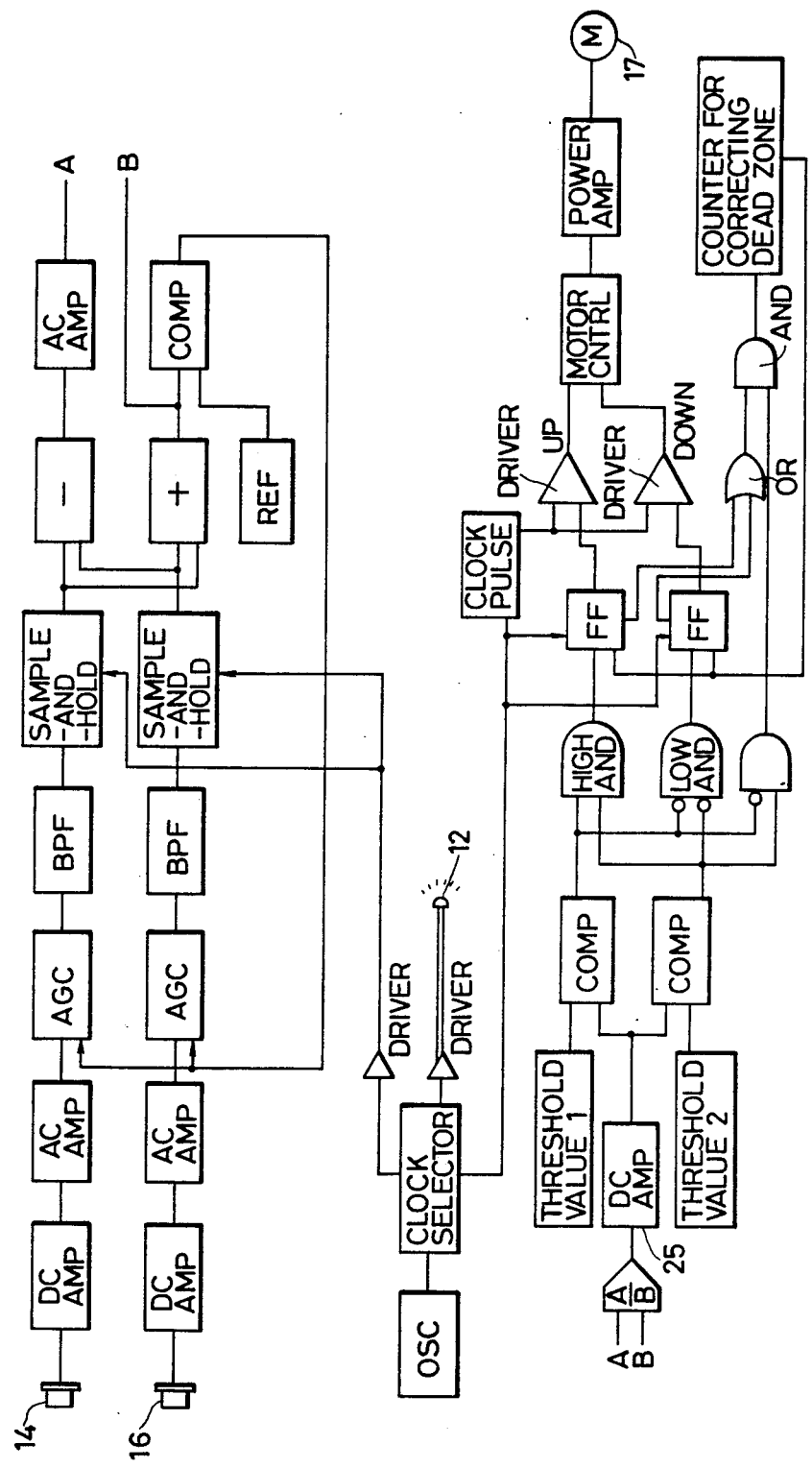
FIG. 3 is a block diagram showing one example of the control system in the automatic focusing device of the invention.

One example of the automatic focusing system is shown in FIG. 3. The outputs of the light receiving elements 14 and 16, after being amplified, are subjected to addition and subtraction to obtain values A and B. The values A and B are divided and the quotient is then amplified by an amplifier 25. The waveform of the output signal of the amplifier 25 is of a typical S-shaped curve as shown in FIG. 4. The signal is compared with threshold values Hv and Lv (FIG. 4). When the signal is in a dead zone d (FIG. 4), no drive signal is applied to the drive element 17. When it is not in the dead zone d, the stage 23 is moved vertically by the drive source 17 until complete focusing is obtained, i.e., the outputs of the light receiving elements 14 and 16 coincide with each other.

The above-described control system in which the stage 23 is moved up and down according to the difference between the outputs of the two light-receiving elements 14 and 16 is well known in the art. Illustrated is only an example of the control system. However, the control system is advantageous in that, since a part of the quantity of light is utilized by the pin holes 13 and 15, the automatic focusing is stably maintained even when the relative position of the automatic focusing infrared beam and the pin hole is somewhat changed in the beam for instance in changing the magnification of the microscope system.

The specific feature of the invention does not reside in that the beam from the infrared LED 12 is applied directly to the objective 1 (i.e., the LED is set at the position of the primary enlarged image 24 of the LED 12 in (FIG. 1), but resides in that the beam is applied to a lens having an intermediate magnification, namely, the automatic focusing condenser 11, to form the primary enlarged image 24 of the infrared LED 12, and is then applied to the objective 1. This provides an automatic focusing function for an objective having a magnification 100 or more.

Figure 2:
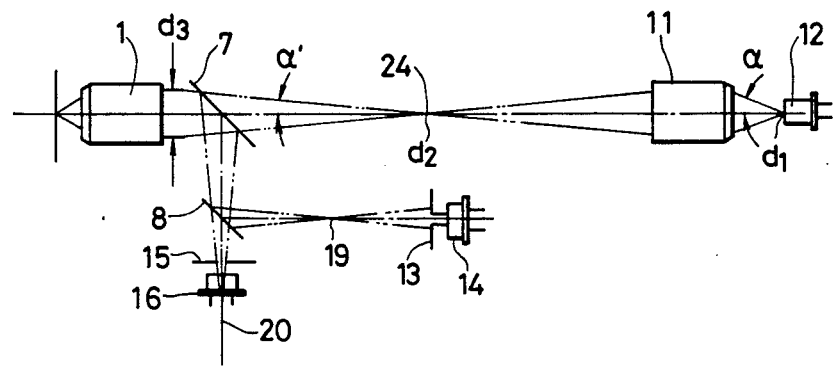
FIG. 2 is an optical diagram outlining only the automatic focusing device in FIG. 1.

This will be described by using specific numerical data with reference to FIG. 2, which shows only the automatic focusing optical system according to the invention (with the microscope system omitted).

If the infrared LED 12 emits light uniformly in a solid angle $2\pi$ and the numerical aperture, on the LED side, of the automatic focusing condenser 11 is represented by $\alpha$, then the quantity of light received by the lens 11 is proportional to $(1-\cos \alpha)$. When the magnification of the objective 1 is 100 (NA 0.9) and that of the automatic focusing condenser 11 is 20 (NA 0.4), the ratio of the quantity of light incident on the objective 1 with the infrared LED 12 positioned at the enlarged image point 24 to the quantity of light incident on the objective with the beam applied to the focusing condenser 11 as in the present invention is as follows:

$$(1 - \cos\alpha)/(1 - \cos\alpha') =$$

$$\frac{(1 - \cos [\sin^{-1} \{NA (0.4)\}])}{(1 - \cos [\sin^{-1} \{NA (0.9)/100\}])} \approx 2061$$

where $\alpha'$ is the numerical aperture, on the image side, of the objective 1 in the case where the infrared LED 12 is positioned at the enlarged image point 24 in FIG. 1. That is to say, the latter quantity of light is more than 2000 times greater than the former quantity. Accordingly, the variations in the quantity of light falling on the light receiving elements 14 and 16, which occur as the specimen 23 is moved, are sufficiently large. Thus, the automatic focusing function is obtained even when the magnification is high.

In the conventional automatic focusing device, the automatic focusing function is effective only when the magnification of the objective 1 is not more than 40.

This is due to the following reason: As indicated in Table 1 below, the numerical aperture on the image side is decreased as the magnification of the objective 1 increases. The quantity of light received in the case where the LED 12 is positioned at the enlarged image point 24 in FIG. 2 is decreased as the magnification increases, as indicated in the rightmost column of Table 1 where the values have been normalized to a magnification of 40. That is, in the case of a magnification of 100, the quantity of light is less than one-third of that in the case of the magnification of 40. On the other hand, in the invention, the numerator of the above expression is for example $(1-\cos \alpha = 0.0835)$, and the quantity of light is 267 times the maximum value (for a magnification of 10) of $(1-\cos \alpha')$ in Table 1.

In the invention, the size of the primary enlarged image provided by the automatic focusing condenser 11 is a important factor. As the infrared LED 12 has a finite diameter $d_1$ (about 100 $\mu$m), the diameter $d_2$ of the enlarged image should be much smaller than the pupil diameter $d_3$ of the objective 1; otherwise, the automatic focusing system will not function.

TABLE 1

| Objective lens magnification | Numerical aperture NA | Numerical aperture on the image side NA' | Angular aperture on the image side $\alpha'$ | $1 - \cos\alpha'$ ($\times 10^{-4}$) | Relative light quantity |
|---|---|---|---|---|---|
| ×100 | 0.9 | 0.009 | 0.516 | 0.406 | 0.31 |
| ×40 | 0.65 | 0.016 | 0.931 | 1.320 | 1 |
| ×20 | 0.4 | 0.02 | 1.146 | 2.000 | 1.52 |
| ×10 | 0.25 | 0.025 | 1.433 | 3.127 | 2.37 |

According to the invention, a considerably large amount of light is provided for automatic focusing as described above. In addition, the invention has the following advantageous secondary effect. Since the image of the automatic focusing LED formed on the specimen 23 is obtained by reducing the primary enlarged image, its diameter is of a suitable size such that the automatic focusing operation is not affected by the variations in reflection factor which are often encountered with small uneven surfaces or small specimens in the IC industry. That is to say, the variations are averaged to provide a stable automatic focusing operation. For instance when, with an objective lens having a magnification 100, the output beam of the LED 12 is applied directly from the position 24, then the diameter of the reduced image in geometrical optics on the specimen is 1 $\mu$m = 100 $\mu$m $\times (1/100)$ with $d_1 = 100$ $\mu$m. Accordingly, the automatic focusing operation is affected directly by the small uneven surfaces of the specimen; that is, the automatic focusing operation is not at all stable. On the other hand, in the invention, when the automatic focusing condenser is replaced by an objective having a magnification of 20, the diameter is 20 $\mu$m = 100 $\mu$m $\times 20 \times (1/100)$. Thus, the range of 20 $\mu$m on the specimen is averaged to provide a stable automatic focusing operation. For instance, the image range of an objective having a magnification 100 is of a diameter of 265 $\mu$m with the field number of an eyepiece being 26.5.

In the automatic focusing device according to the invention, the focus detecting beam applied through the dichroic mirror to the objective in the microscope system is applied to the condenser to form its enlarged image before striking the objective. This simple operation provides the automatic focusing operation for an objective having a magnification 100 or more, which has been impossible with the conventional automatic focusing device. Therefore, the automatic focusing device of the invention can be widely and effectively used in the field of handling small patterns such as those in the IC industry.

We claim:

1. A focusing device, comprising:
   a diverging light source;
   an enlarging condenser lens receiving light from the light source;
   a first half mirror disposed on a side of an enlarged image point of said light source, said side being opposite a side of said image point facing the condenser lens;
   an objective receiving light from said first half mirror for illuminating a portion of a specimen to be focused;
   a second half mirror for receiving light reflected from said specimen back through said objective from said first half mirror, thereby creating two half beams;
   a first detector for receiving a first of said half beams, located beyond a focus point of said first half beam; and
   a second detector for receiving a second of said half beams, located before a focus point of said second half beam.

2. A focusing device, as recited in claim 1, wherein said light source is an infrared light-emitting diode.

3. An automatic focusing device, as recited in claim 1, further comprising automatic focusing circuitry receiving signals from said first and second detectors for automatically providing an indication of the vertical focusing of said specimen.

4. An automatic focusing device, as recited in claim 3, further comprising:
   a vertically movable stage on which said specimen is mounted; and
   driving means controlled by said automatic focusing circuitry for vertically moving said stage.

5. An automatic focusing device, as recited in claim 4, wherein said light source is an infrared light-emitting diode.

6. An automatic focusing device, as recited in claim 4, wherein said automatic focusing circuitry includes means for comparing said signals from said first and second detectors to thereby form said indication of the vertical focusing.

* * * * *